United States Patent
Hall et al.

(10) Patent No.: US 11,839,007 B2
(45) Date of Patent: Dec. 5, 2023

(54) SYSTEMS FOR A NO-NEUTRAL SWITCH AND DIMMER

(71) Applicant: Consumer Lighting (U.S.), LLC, Norwalk, CT (US)

(72) Inventors: Mason Hall, University Heights, OH (US); Tomislav J. Stimac, East Cleveland, OH (US); Aijun Wang, Shanghai (CN)

(73) Assignee: SAVANT TECHNOLOGIES LLC, Norwalk, CT (US)

( * ) Notice: Subject to any disclaimer, the term of this patent is extended or adjusted under 35 U.S.C. 154(b) by 350 days.

(21) Appl. No.: 17/012,028

(22) Filed: Sep. 3, 2020

(65) Prior Publication Data
US 2021/0084738 A1 Mar. 18, 2021

Related U.S. Application Data

(60) Provisional application No. 62/899,847, filed on Sep. 13, 2019.

(51) Int. Cl.
*H05B 47/25* (2020.01)
*H05B 47/10* (2020.01)

(52) U.S. Cl.
CPC ............. *H05B 47/25* (2020.01); *H05B 47/10* (2020.01); *Y02B 20/40* (2013.01)

(58) Field of Classification Search
CPC ........ Y02B 20/40; H05B 47/19; H05B 45/59; H05B 47/10; H05B 47/25
USPC .................................................. 315/291, 287
See application file for complete search history.

(56) References Cited

U.S. PATENT DOCUMENTS

| | | | |
|---|---|---|---|
| 3,180,974 | A | 4/1965 | Darling |
| 4,158,792 | A | 6/1979 | Kuroi et al. |
| 5,751,818 | A | 5/1998 | Gertz et al. |
| 6,459,554 | B1 | 10/2002 | Meiners et al. |
| 9,154,311 | B2 | 10/2015 | Heidler |

(Continued)

OTHER PUBLICATIONS https://insights.regencylighting.com/can-you-stop-led-flickering-with-a-dummy-load-or-load-resistor Can you stop LED flickering with a "dummy load" or load resistor? Posted by Brandon Melton on Oct. 18, 2019 (Year: 2019).*

(Continued)

*Primary Examiner* — Arnold M Kinkead
(74) *Attorney, Agent, or Firm* — WOOD IP LLC

(57) ABSTRACT

An enhanced smart lighting system (ESLS) for use in buildings without neutral wire connections for wall switches. The ESLS entails both a no-neutral wire smart lighting switch (NNWSLS) and a physically separate load adapter. The NNWSLS includes a sensing, control, or communication system (SSCCS) such as integrated WiFi. The load adapter mitigates electrical fluctuations which may be induced in a power load (for example a lightbulb) by the smart lighting switch, particularly when the smart lighting switch is nominally powered off but still has some current flow. The load adapter is an intermediary between the power load and a conventional load receptacle. The load adapter has an integrated dummy load configured in parallel with the power load. The dummy load provides an electrical pathway for low levels of electricity which run through the light socket even when the NNWSLS is set to an "off" configuration.

16 Claims, 6 Drawing Sheets

(56) References Cited

U.S. PATENT DOCUMENTS

| | | |
|---|---|---|
| 10,716,179 B1 | 7/2020 | Wang |
| 10,904,972 B2 | 1/2021 | Chen et al. |
| 10,917,949 B2 | 2/2021 | Krick et al. |
| 10,959,307 B2 | 3/2021 | Benning et al. |
| 11,219,106 B2 | 1/2022 | Chen et al. |
| 2013/0187481 A1 | 7/2013 | Heidler |
| 2020/0146123 A1 | 5/2020 | Chen et al. |
| 2020/0178372 A1 | 6/2020 | Benning et al. |
| 2021/0037626 A1 | 2/2021 | Chen et al. |
| 2021/0084738 A1 | 3/2021 | Hall et al. |

OTHER PUBLICATIONS

How to Wire a Smart Light Switch With no Neutral Wire Dec. 19, 2019 One Hour Smart Home https://www.youtube.com/watch?v=nGPgJmyjgp4 (Year: 2019).*

GE CYNC Smart Lightswitch On/Off Paddle Style, no Neutral Wire Required, Bluetooth and 2.4 GHz Wi-Fi Switch . . . First available Feb. 7, 2020. https://www.gelighting.com/led-lights/bulbs/ge-cync-smart-switch-no-neutral-wire-required-paddle-style-bluetooth-and-24-ghz (Year: 2020).*

* cited by examiner

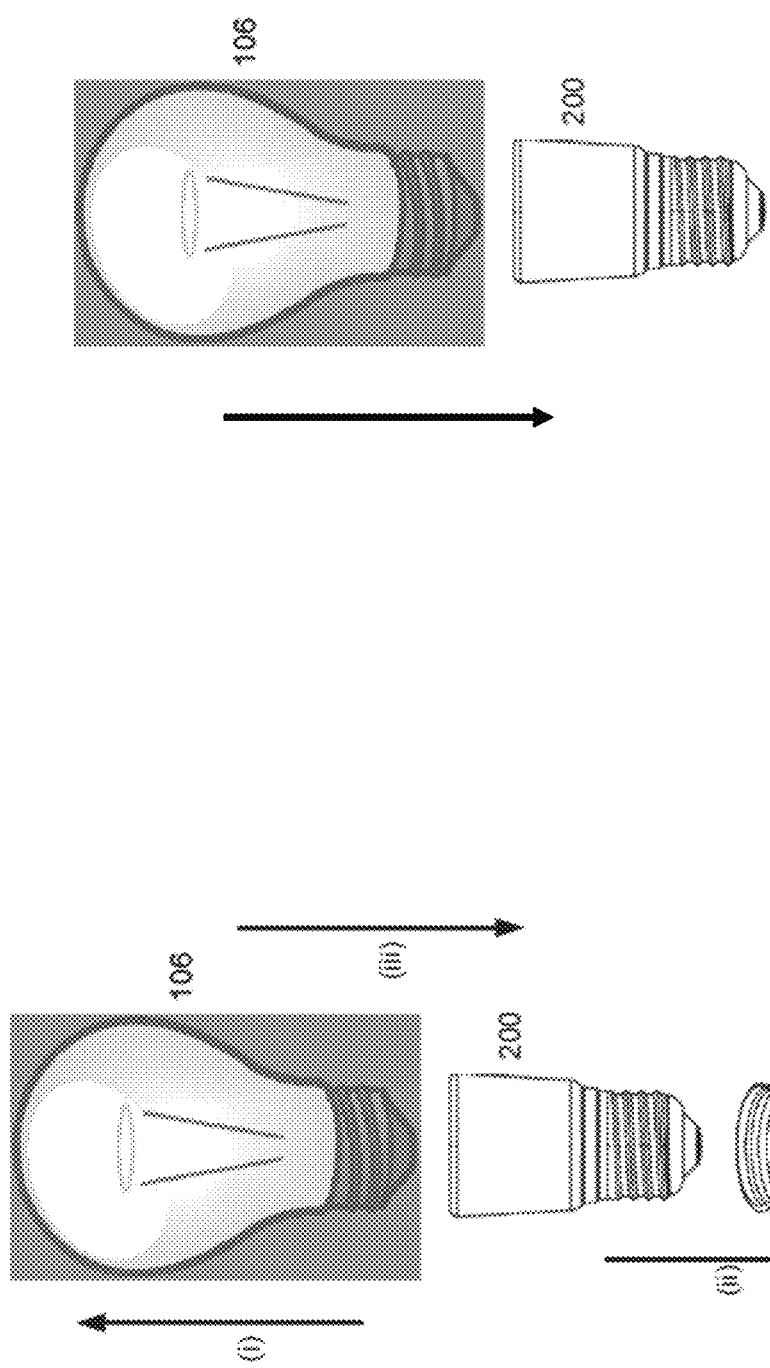
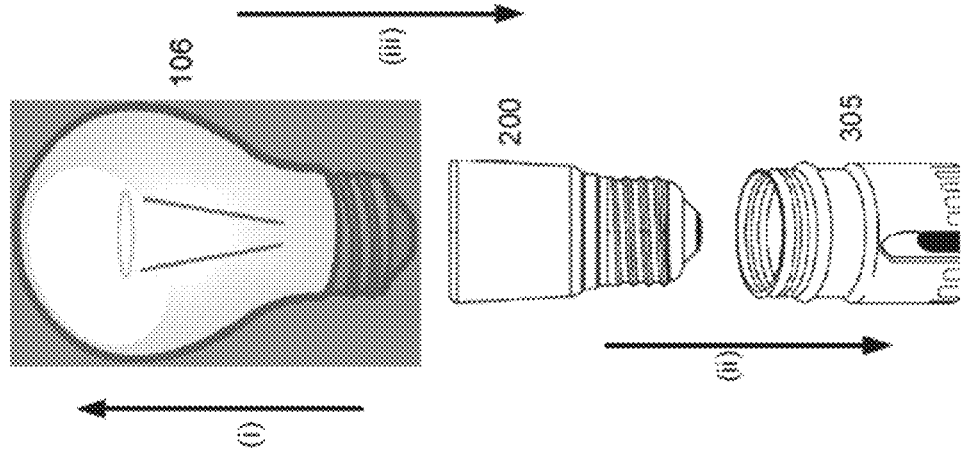
FIG. 3B
FIG. 3A

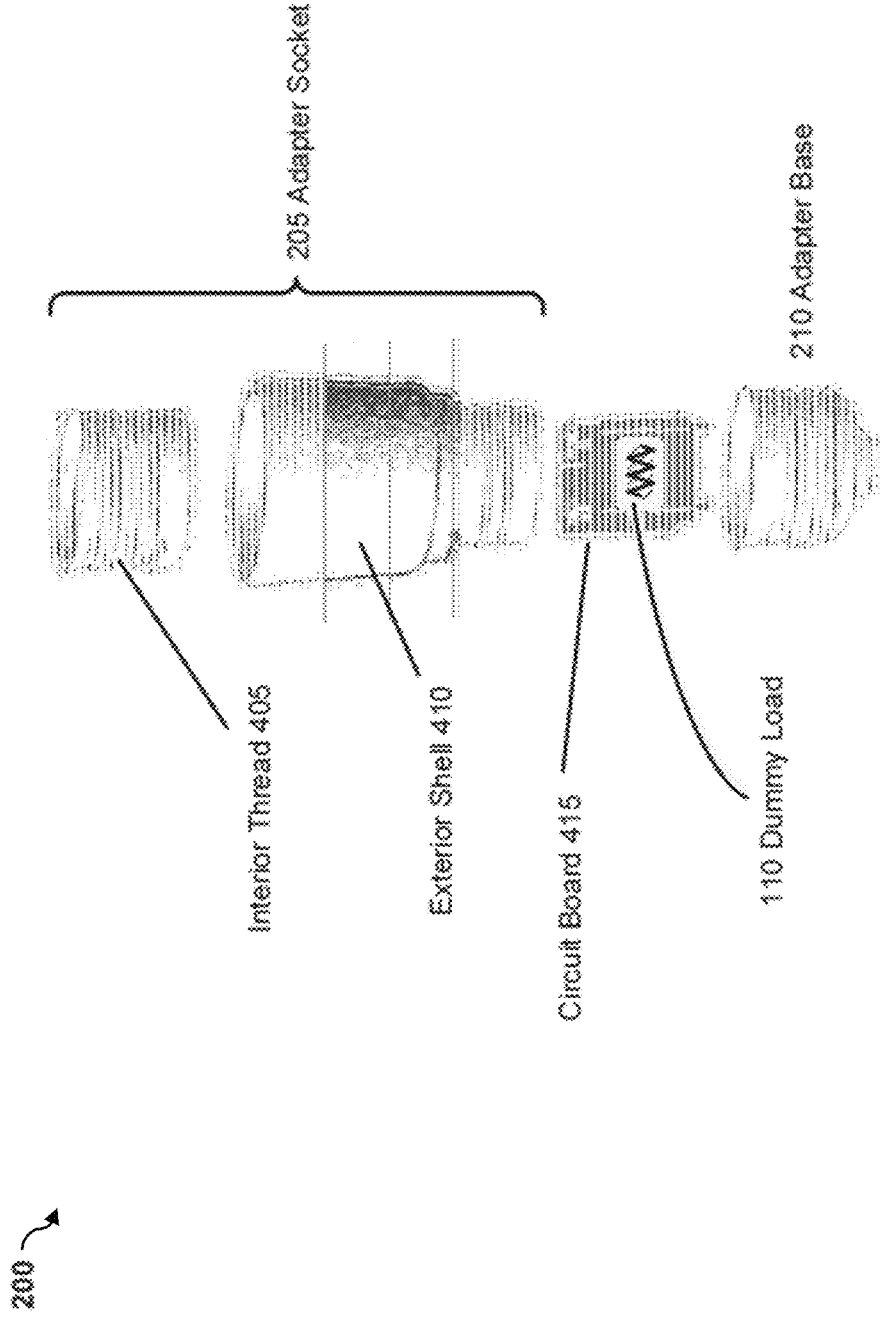

SYSTEMS FOR A NO-NEUTRAL SWITCH AND DIMMER

CROSS-REFERENCE TO RELATED APPLICATIONS

The present application claims the benefit of U.S. Provisional Application No. 62/899,847, filed Sep. 13, 2019. The present application is related to co-pending U.S. patent application Ser. No. 16/798,282, filed Feb. 21, 2020, and to Chinese Patent Application No. 2019107068987, filed Jul. 31, 2019, all of which are incorporated by reference as if included here in their entirety.

TECHNICAL FIELD

The present invention relates generally to lighting system assemblies. More particularly, the present invention relates to in-wall switches and dimmers with no-neutral wiring required.

BACKGROUND

Conventional non-smart lighting switches are on/off switches typically mounted on walls to control power for interior lighting and interior power sockets. Such non-smart switches conventionally have three wires: (i) A line wire which brings in the electrical current (for example, typically 120 volt 60 cycle alternating current in the United States), (ii) a load wire to bring power to a load such as a light fixture, and (iii) a ground wire for safety.

With the emergence of smart homes and smart items designed for inter-device communication, sensing, and control, new "smart lighting switches" were developed. Legacy smart lighting switches (SLS) require a fourth wire at the switch location, called a neutral wire. As understood by those of skill in the art, the neutral wire provides continuous power to the switch, enabling smart devices, such as smart radios, to run continuously in the background even when current to the load is interrupted (that is, when the main current is "off"). This fourth neutral wire also enables continuous communication with the smart lighting switch, thus facilitating out of home control of other smart devices integrated via the switch.

Although newer homes and/or smart homes, are equipped with a neutral wire at lighting switch location, a large segment of homes in the United States and other countries do not provide a neutral wire at the location of the SLS. The absence of this neutral wire can make configuring these homes, for installation of smart lighting switches, more difficult and more costly.

Several legacy no-neutral wire solutions are currently available in the market to remedy the challenges associated with older or less equipped homes. The available legacy no-neutral wire solutions simply remove the neutral wire from the smart lighting switch. However, when the neutral wire is not present, the constant power available to be provided to smart devices integrated with the SLS is severely limited.

At least one more significant problem may be created by simply removing the neutral wire from the overall electrical architecture. A key component to integration of the smart devices into the smart lighting switch is Wi-Fi availability. When the neutral wire is removed, most of the traditional systems are not optimized with integrated WiFi (that is, in-switch WiFi) to enable them to run Wi-Fi enabled devices, such as a Wi-Fi radio, which typically have a higher electricity usage for constant power. Wi-Fi is also required to facilitate many of the other smart home attributes and features (e.g., voice compatibility) consumers usually expect from out-of-home controlled smart devices.

Accordingly, these traditional no-neutral wire solutions require that the no-neutral wire smart switch be paired with a secondary device, such as a separate Wi-Fi hub. The separate Wi-Fi hub is required to facilitate integration and communication with other Wi-Fi enabled smart devices.

Given the aforementioned deficiencies, a need exists for a no-neutral-wire smart lighting switch (NNWSLS) that includes a built-in Wi-Fi capability. In particular, what is needed are methods and systems that provide a no-neutral wire in wall lighting switch solution that is also devoid of a paired-but-separate WiFi hub.

SUMMARY OF THE INVENTION

Under certain circumstances, embodiments of the present invention include a smart lighting switch configured to provide constant power to smart devices connected thereto. The lighting switch is devoid of a neutral wire. Also provided is a Wi-Fi module integrated into the lighting switch.

Some embodiments of the present system and method provide a single smart lighting device, integrating Wi-Fi into a No-Neutral-Wire Smart Lighting Switch (NNWSLS with wi-fi protocol) to provide constant power for connected smart devices. Systems constructed in accordance with the embodiments are optimized in a manner to be able to run a Wi-Fi radio which is integrated into the NNWSLS, but without the presence of a neutral wire.

An optimized no-neutral wire solution significantly expands the commercial market for smart lighting switches. For example, the optimized hub-less capability extends availability of SLSs, and other smart home features, to more users and homes across the United States—to homes that do not include a neutral wire at the lighting switch or their junction (J) box. Switches constructed in accordance with the embodiments are now able to be much more prolific in the consumer's home.

In some embodiments of the present system and method, a load adapter is provided for use in conjunction with the NNWSLS. The load adapter is a physically separate unit or component from the NNWSLS. In embodiments, the load adapter is an electrical socket which can be screwed into a conventional incandescent light socket, and into which a conventional incandescent bulb may be inserted. In practice, then, the load adapter is an intermediate socket which a home-owner can put in place between a light bulb and the light bulb socket. The purpose and effect of the load adapter is to enable conventional incandescent lighting to function effectively (and in particular, to avoid electrical instabilities such as "ghost lighting" when power is provided via the NNWSLS).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings:

The accompanying drawings, which are incorporated herein and form part of the specification, illustrate the present invention and, together with the description, further serve to explain the principles of the invention and to enable a person skilled in the relevant art(s) to make and use the invention.

FIG. 3A presents a view of lightbulb adapter constructed and arranged in accordance with embodiments of the present invention, along with a lightbulb and lightbulb socket.

FIG. 3B is a photograph of lightbulb adapter constructed and arranged in accordance with embodiments of the present invention, along with a lightbulb.

FIG. 4A presents an exploded schematic view of an exemplary adapter socket according to the present system and method.

DETAILED DESCRIPTION OF EXEMPLARY EMBODIMENTS

Figure 1:
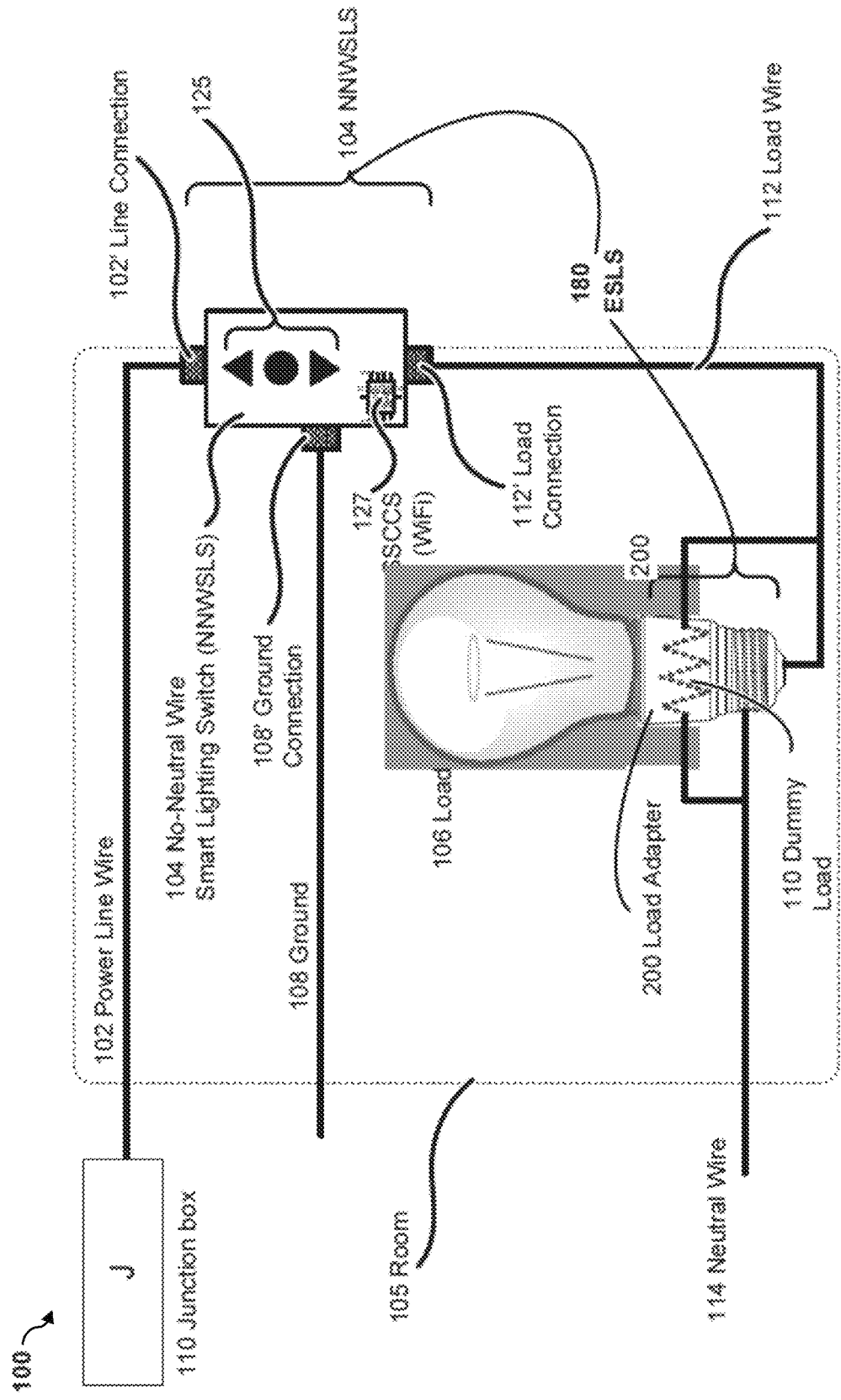
FIG. 1 illustrates an exemplary circuit system constructed and arranged in accordance with embodiments of the present invention.

The following detailed description is merely exemplary in nature and is not intended to limit the system and methods, nor the elements or steps of the system and method, nor its applications, and its uses disclosed herein. Further, there is no intention for the scope to be bound or limited to or by any theory presented in the preceding background or summary, nor in the following detailed description.

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

By way of background, for any circuit that has wired a lighting switch constructed in accordance with embodiments of the present system and method also has the ability to make that circuit smart. The term "smart", as used herein, means a user can control the switch, via a computer application, because SLS has Wi-Fi capability and has a connection to the cloud.

Therefore, when the user is out of the home, using an NNWSLS in accordance with the embodiments, they can remotely control the switch. For example, the user can remotely control their home lighting on that circuit. The controlled lights could be traditional light-emitting diodes (LEDs), halogen bulbs, or incandescent bulbs—all controllable by adding that NNWSLS to the wall.

The user would also have the ability to perform other smart home features in addition to controlling lighting, such as scheduling. For example, the the same lighting circuit could be used to schedule the activation of their lights. The user can also add a voice assistance device to the house.

Continuous Power Requirements: Operating a smart lighting switch without a neutral wire (also referred to herein as a "no-neutral wire smart lighting switch", or an NNWSLS) does impose a trade-off in power usage. That is, a smart lighting switch without a neutral wire is not receiving a continuous source of power from the home J box. However, a lack of a neutral wire J box power doesn't eliminate the need for continuous power by the NNWSLS.

Since continuous power is still needed, it must be supplied from somewhere else in the house to obtain sufficient power to run on-board radio at the switch. One exemplary technique of providing continuous power without a neutral wire, implemented herein, is to effectively fetch power from a lighting fixture (i.e., the lighting source in the home). All residential homes have a neutral wire at the fixture (not shown). In the embodiments, this technique is implemented through a load wire passed down from a fixture to an NNWSLS. This approach fetches enough minimum power from the fixture to run the NNWSLS, in the absence of a neutral wire at the J box.

Electrical Instabilities in the Load ("Ghost Lighting"): An unintended effect, however, occurs in some cases where power to run the NNWSLS is obtained from the light fixture. In these cases, with some bulbs (LED bulbs and certain driver combinations on LED bulbs), there is a negative situation that arises with the bulb called "ghost lighting." For example, when the user turns the light switch off, instead of the bulb turning off 100%, there is enough residual energy passing along the load wire such that the bulb continues to illuminate, or provide a warm glow. In other cases, other electrical instabilities, such as flicker of the light, may occur.

FIG. 1 illustrates one embodiment of the present system and method, in the form of a circuit system 100 which can eliminate load instabilities, such as ghost lighting, flicker, or other problems, in a room equipped with an NNWSLS. The circuit system 100 is presented schematically and not to scale, with numerous structural details omitted for clarity, and is constructed and arranged in accordance with some embodiments of the present system and method.

The exemplary circuit system 100 includes a power line 102 configured for coupling a voltage source J 110 to a line connection 102' of a lighting wall switch 104 (which may be an on/off switch or dimmer switch), and which may be installed in a wall of a room 105. The power line 102 feeds electrical current from a junction box J 110 in the home. The NNWSLS 104 has an electrical load connection 112' which may be used to create a series connection with a load 106 (which may for example be a conventional home electrical incandescent lamp 106 or LED lamp 106) via a load wire 112. Also connected to a ground connection 108' of the NNWSLW 104 is a ground line 108. A load adapter 200 (illustrated in further detail in figures below) includes or incorporates a dummy power load 110. The dummy power load 110 is internally configured to be in parallel with the load 106 to bypass part of the current in a main bus of the light bulb 106.

In embodiments, the NNWSLS 104 may include one or more exterior switches or controls 125, such as an on/off button(s) or rotary or slide dimmer control, which may be used to determine an on/off state or brightness level for the load 106. In some embodiments, the controls 125 may be implemented via wireless control, touch screen control, optical control (laser or infrared), or voice input, in alternative to or additional to physical/mechanical buttons, sliders, or rotary controls. In embodiments, the NNWSLS 104 may include or incorporate one or more smart sensing, control, or communication systems (SSCCS) 127, including for example and without limitation a hardware processor, WiFi communications link, Bluetooth link, a microphone and sound processing system, optical sensors, and other smart electronics known in the art.

Residual Current: For effective operations, the SSCCS 127 may require ongoing, time-continuous electrical power even when the NNWSLS 104 is turned "off" and the load 106 is substantially powered off (that is, the lightbulb is dark). This limited current flow may be referred to as "residual current" Ir. Since no neutral wire is present in the NNWSLS 104, the residual current necessarily flows through the power line wire 120 to the load wire 112, and so on into the load 106. So, even switched "off", the load 106 will still receive residual current. Depending on the power requirements of the SSCCS 127, and compared with a normal or operational current flow Io when the current is switched on, a residual current Jr may be for example and without limitation 1% of the Io, 2% of the Io, 5% of the Io, or some other percentage or fraction of the Io.

In embodiments, the exemplary system 100 supports at least two functions: (i) to help to do power fetching when the switch is turned "on", that is, when current is established, and (ii) decrease "ghost light", flicker, or other reductions in electrical instabilities on some types of lamps 106 due to the residual current Ir.

Enhanced Smart Load System: Some elements of exemplary system 100 are typically built in as part of a home or other architectural structure, for example the power line 102, ground wire 108, the load wire 112 and the neutral wire 114. The NNWSLS 104 and the load adapter 200 are typically provided by a third party vendor such as GE Lighting Systems. In combination, NNSWLW 120 and the load adapter 200 with the dummy load 110 may be referred to, and are referred to herein, as an Enhanced Smart Lighting System 180 (ESLS) or alternatively as an Enhanced Smart Load System 180 (ESLS).

In alternative embodiments, the load adapter 200 with its built-in dummy load 110 can be used to work together with a variety of other smart products which are on the market or which may emerge in the future, to solve the compatibility issues of smart items with no-neutral wire building structures. The load adapter 200 can also be used to solve the dimming depth and flicker issue which may occur with traditional Triac dimmer.

It will be noted that while FIG. 1 illustrates the dummy load 110 as being superimposed upon, and apparently exterior to, or on the exterior surface of, the load adapter 200, this is only for purposes of illustrating the circuit configuration including the dummy load 110. As discussed further below, in some embodiments of the present system and method the dummy load 110 is structurally incorporated into an interior region of the load adapter 200, such as a base region.

Therefore, and in some embodiments, the present system and method includes in-wall smart switches 104 and/or light dimmers 104 that: (i) provide integrated WiFi in the switch/dimmer 104 without requiring an external WiFi hub, and (ii) don't require a neutral wire. Without the need for a neutral wire at the switch, the smart switches 104 are accessible to more households, especially those households which are not wired with neutral wires for direct connection with their wall switches. Installation and setup is easier: No WiFi hub required and compatible with most common household wiring, including wiring found in older homes.

Switches and dimmers 104 designed in accordance with the embodiments combine Wi-Fi 127 and no-neutral wiring into one solution, creating a hubless experience that enables out of home control and connects directly to an Alexa or Google Assistant device. No longer are users required to purchase a separate and costly Wi-Fi hub device. This all-in-one solution makes smart lighting more economical for users to start and expand their smart homes.

Adapter Socket

Figure 2:
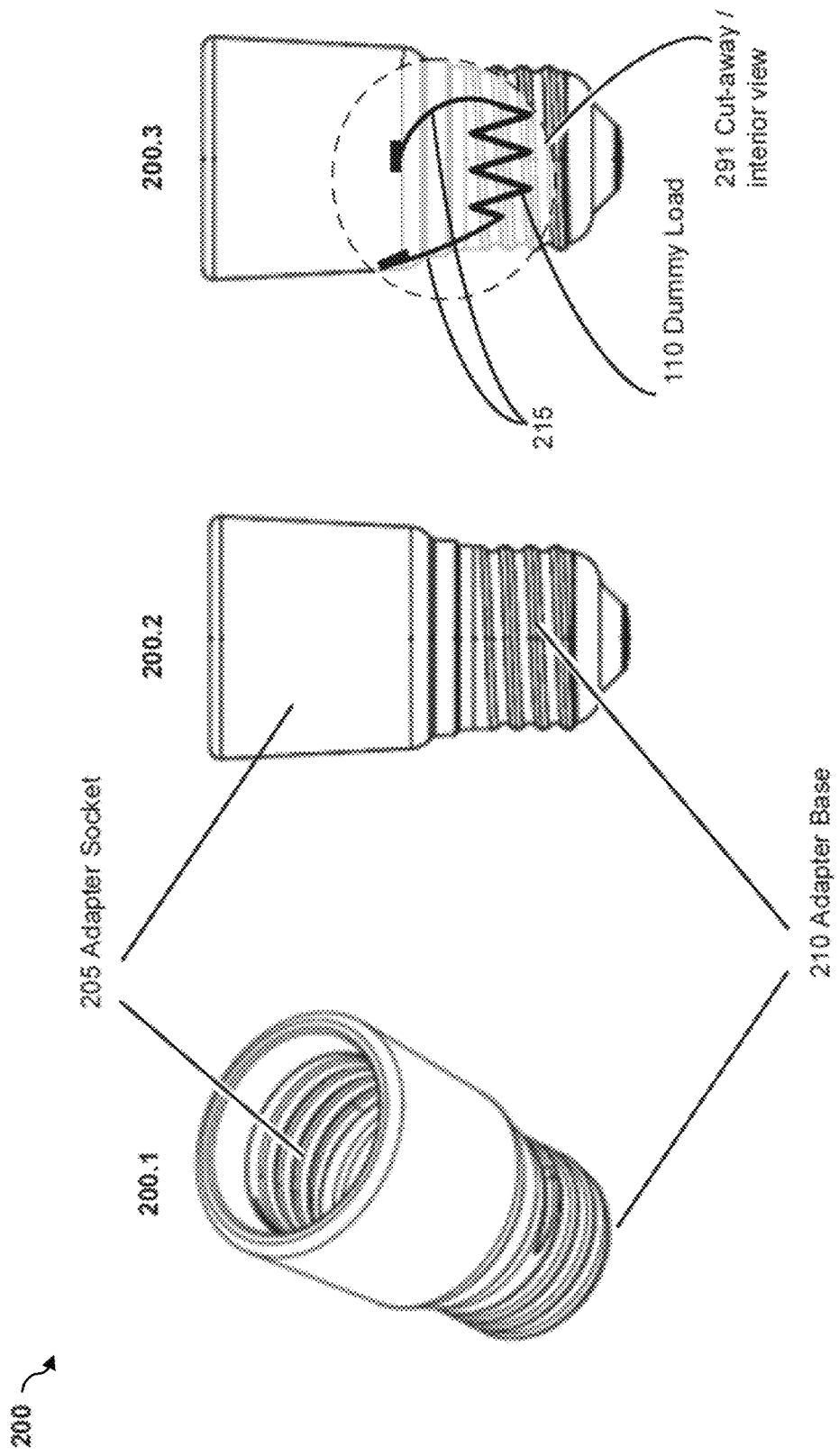
FIG. 2 presents three views of a lightbulb adapter constructed and arranged in accordance with embodiments of the present invention.

FIG. 2 presents a perspective view 200.1 and two side views 200.2, 200.3 of a load adapter 200 constructed and arranged in accordance with embodiments of the present system and method. The load adapter 200 includes an adapter base 210 which is configured to be mechanically coupled with and electrically coupled with an electrical socket 305 (see FIG. 3) for the power load 106. In some embodiments of the present system and method the target electrical socket 305 may a lightbulb socket 305 in a lamp and light fixture (the lamp/light fixture is not shown in the figures), such as for example but without limitation a standard E26 lamp socket 305 (see FIG. 3) which accepts the common E26 light bulbs used in many U.S. house lamps and wall/ceiling fixtures. In some embodiments, the mechanical coupling of the adapter base 210 and electrical socket 305 may be enabled via a threaded adapter base 210 and a threaded lamp socket 305, so that the base 210 can be screwed into the lamp socket 305.

The load adapter 200 also includes its own adapter socket 205 which is configured to receive, and be electrically coupled with, a light bulb such as an E26 light bulb. View 200.3 illustrates, schematically and via a cut-away or interior view 291 the dummy load which is mounted interior to the load adapter 200, and which is configured to be coupled in parallel with an inserted light bulb via electrical connections and contacts 215.

Adapter Socket, Light Bulb, Light Fixture

FIG. 3A illustrates an exemplary instance of how the load adapter 200 of the present system and method may be used in practical application. In an exemplary embodiment, and to use the load adapter 200, the user simply: (i) unscrews their bulb 106 (if a bulb is already present in the electrical socket 305 [see FIG. 3]); (ii) installs the load adapter 200 of the present system and method into the electrical socket 305 of a lamp (the lamp as a whole is not illustrated in the figure); and (iii) and screws the bulb 106 into the load adapter 200. (The action order indicated is exemplary only. Alternatively, the user may install the bulb 106 into the load adapter 200 first, and then installs the bulb 106 plus load adapter 200 into the light bulb socket 305 of a lamp or other lighting figure.)

FIG. 3B is a photograph of an exemplary load adapter 200 of the present system and method, with a nearby lightbulb 106 positioned to be screwed into the load adapter 200.

Adapter Socket, Additional Embodiments

In embodiments of the present system and method, the load adapter 200 is used together with a no-neutral switch (NNWSLS) 104, so that a dummy load 110 in the load adapter 200 (for example, a resistor) is electrically wired in parallel with load lamp 106 to share part of the current in the main bus.

In legacy systems, when a user (such as a homeowner) turns off the NNWSLS 104, the load lamp 106 should ideally be turned off completely; but in operational reality, in the no-neutral wire case, there is current in the main bus (the load wire 112 and the neutral wire 114) when the NNWSLS 104 is at off status.

This necessary neutral current can create undesirable electrical instabilities in the load 106, such as turning on the lamp 106 slightly (resulting in "ghost lighting" emanating from the light bulb 106), flickering of the light bulb, generation of heat when the lightbulb is intended to be off, or potentially unwanted, low-level sounds associated with some low threshold level of electricity in the load.

The load adapter 200 of the present system and method, with its integrated dummy load 110, reduces or eliminates (that is, mitigates) the ghost lighting or other electrical instabilities. In some embodiments of the present system and method, the load adapter 200 of the present system and method has no communications internal smart elements of its own; for example, the load adapter typically does not have any WiFi or Bluetooth capabilities, nor any kind of transceiver. In some embodiments the load adapter 200 has no control functions or control elements for the load lightbulb 106 (for example, no dimming or on off-capacity—these capabilities are provided by the NNSWLS).

Thus, in embodiments of the enhanced smart lighting system (ESLS) 180, lighting control and the elimination of ghost lighting are structurally and functionally segregated; the NNWSLS 104 performs lighting control while the load adapter 200 with the dummy load 110 provides for mitigation of ghost lighting and possibly other undesirable electrical effects in the load 106. Nonetheless, the NNWSLS 104 and the load adapter 200, which together comprise the ESLS 180, are designed to complement each other when integrated into a home lighting circuit, providing an optimized lighting experience in homes which have no neutral wiring.

It will be noted that the load adapter 200 of the present system and method, while designed for use with switches and dimmers 104 made by General Electric, Inc., is not limited to use with General Electric switches and dimmers 104. The load adapter 200 of the present system and method may also used with switches or dimmers from third party companies to solve the ghost light issue, flickering light emissions, and other electrical instabilities which may arise with loads 106 in homes or buildings with no neutral writing for electrical switches 104.

FIG. 4A presents a schematic, exploded view of an exemplary load adapter 200 according to the present system and method. Exemplary load adapter 200 includes an interior thread 405 which is configured to receive a lightbulb 106, and to provide electrical connection for the lightbulb 106. The interior thread 405 is configured to be seated within a first end of an exterior shell 410, which is typically a non-conducting material. Attached to a second end of the exterior shell 410 is the adapter base 210, which is designed and configured to be screwed into a lamp fixture 305. Interior to the load adapter 200, and which may be situated in an interior space which is jointly surrounded by the exterior shell 410 and the adapter base 210, is a circuit board 415. The circuit board includes the dummy load 110.

Persons skilled in the relevant arts will appreciate that the configuration and arrangement of elements 110, 205, 210, 405, 410, 415 is exemplary only. Similar, additional, or alternative elements may be employed for the load adapter 200 consistent with the present system and method and the appended claims. If will further be noted that some elements which may be present in the load adapter 200, such as various internal connecting wires, screws, and other elements necessary for assembly or electrical conduction, have been omitted for simplicity.

Figure 4B:
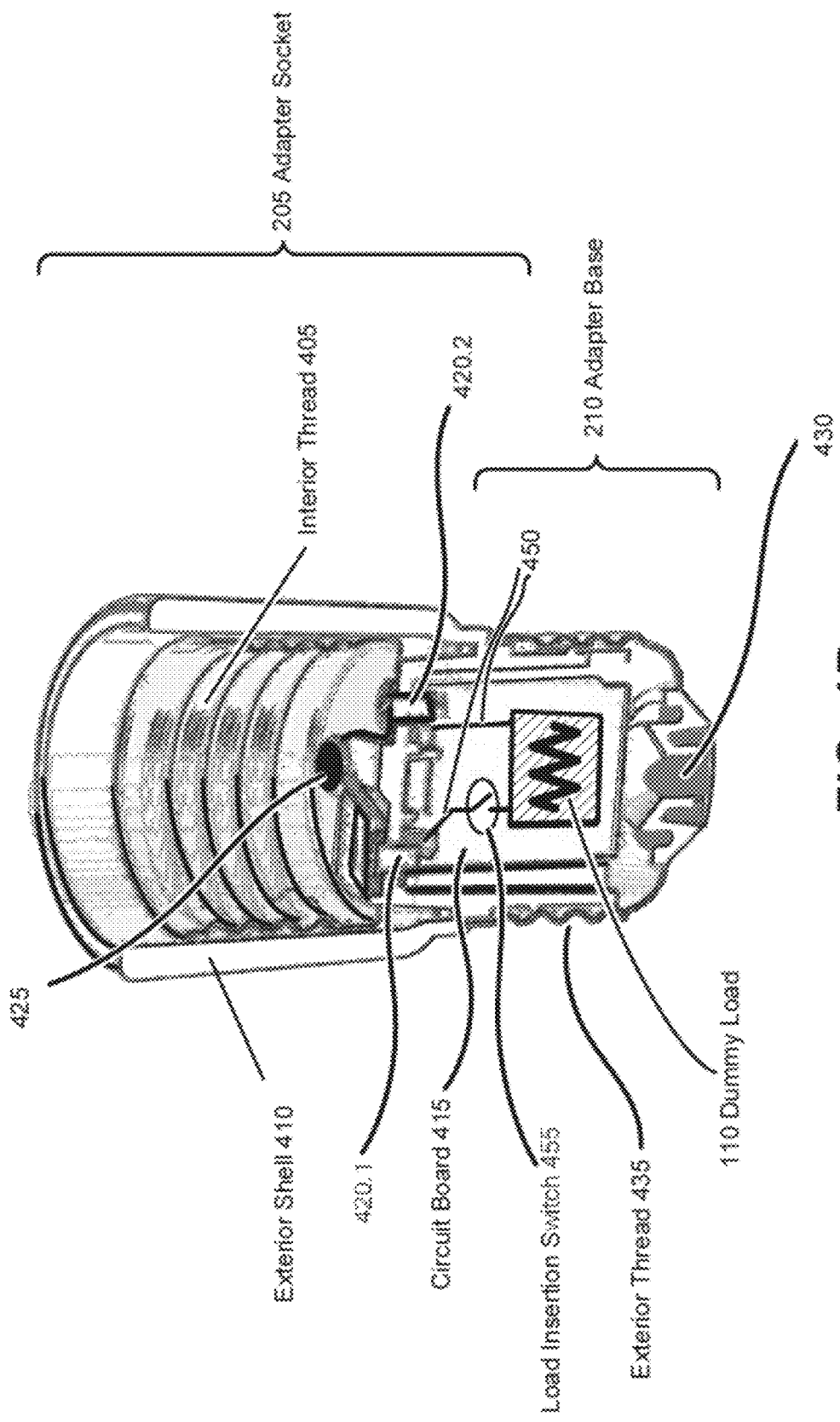
FIG. 4B presents a schematic, cross-sectional view of an exemplary adapter socket according to the present system and method.

FIG. 4B presents a schematic, cross-section view of an exemplary load adapter 200 according to the present system and method, which may be the same or similar to the load adapter 200 of FIG. 4A above.

Exemplary load adapter 200 includes the interior thread 405 which is configured to receive a lightbulb 106, and to provide electrical connection for the lightbulb 106. The interior thread 405 is seated within a first end of an exterior shell 410, which is typically a non-conducting material. Attached to a second end of the exterior shell 410 is the adapter base 210, which is designed and configured to be screwed into a lamp fixture 305. Interior to the load adapter 200, and typically situated in a space surrounded by the exterior shell 410 and the adapter base 210, is the circuit board 415 with the dummy load 110.

Dummy Load: In some embodiments of the present system and method the dummy load 110 may simply be a resistor. In alternative embodiments, the dummy load 110 may include one or more electrical components in addition to, or alternative to, a resistor, including for example and without limitation one or more capacitors, inductors, diodes, or transistors, so that the dummy load 110 functions as an impedance rather than a simple resistance; or so that the dummy load 110 may function as a rectifier or other current filtering circuit, in addition to being an impedance. Two or more resistors may be employed as well. The dummy load 110 is configured to provide a path 450 for electrical current which is a circuit path 450 that is parallel to the path through a lightbulb 106 (which may be inserted into and electrically coupled with the exemplary load adapter 200).

Optionally, in some embodiments of the present system and method, the circuit path 450 may include an internal dummy-load insertion switch 455 which may be configured as "closed" to insert the dummy load 110 in parallel with the load 106; or configured as "open" (as shown in FIG. 4B) to temporarily disable the dummy load (that is, to functionally eliminate the parallel connection of the dummy load 110 with the load 106). The load connection switch 455 may be implemented via one or more transistors or other switching components. In alternative embodiments of the present system and method, connection switch 455 may be omitted, meaning that the dummy load is effectively always locked in as a parallel source of resistance and/or impedance with the load 106.

In general, the dummy load is configured to provide mitigation for electrical side effects, such as "ghost light" and/or flickering light (unsteady or wavering light), which may arise due to power flow which may flow through the load adapter 200 when a NNWSLS is configured in series with the lighting fixture 305 and/or lightbulb 106 (or other load 106).

Exemplary electrical connections 420 (including some electrical connections which may not be shown in the figure) made of suitable conductive materials ensure that the dummy load 110 is configured along a circuit path for electrical current which that is parallel to the path through a lightbulb 106 which may be inserted into and electrically coupled with the exemplary load adapter 200.

In accordance with the present system and method, the circuit board 415, dummy load 110, and electrical connectors 420 provide an alternative current path for a neutral current which supports NNWSLS 104 (including any built-in WiFi of the NNWSLS) which mitigating any ghost lighting which might otherwise result from the neutral current passing through the load 106.

Electrical connection 425 and interior thread 405 provide a current path for an inserted lightbulb 106 (not shown in the figure). Exemplary electrical connection 430 and exterior thread 435, possibly along with other electrical wires and connections not shown or not labelled in the figure, provide the conducting path for both (i) main current which illuminates light bulb 106 and for (ii) the neutral current.

Persons skilled in the relevant arts will appreciate that the configuration an arrangement of elements 110, 205, 210, 405, 410, 415, 420, 425, 430, 435 is exemplary only. Similar, additional, or alternative elements may be employed for load adapter 200 consistent with the present system and method and the appended claims. If will further be noted that some elements which may be present in the load adapter 200, such as various internal connecting wires, screws, and other elements necessary for assembly or electrical conduction, have been omitted for simplicity.

Exemplary Dummy Load

Figure 5:
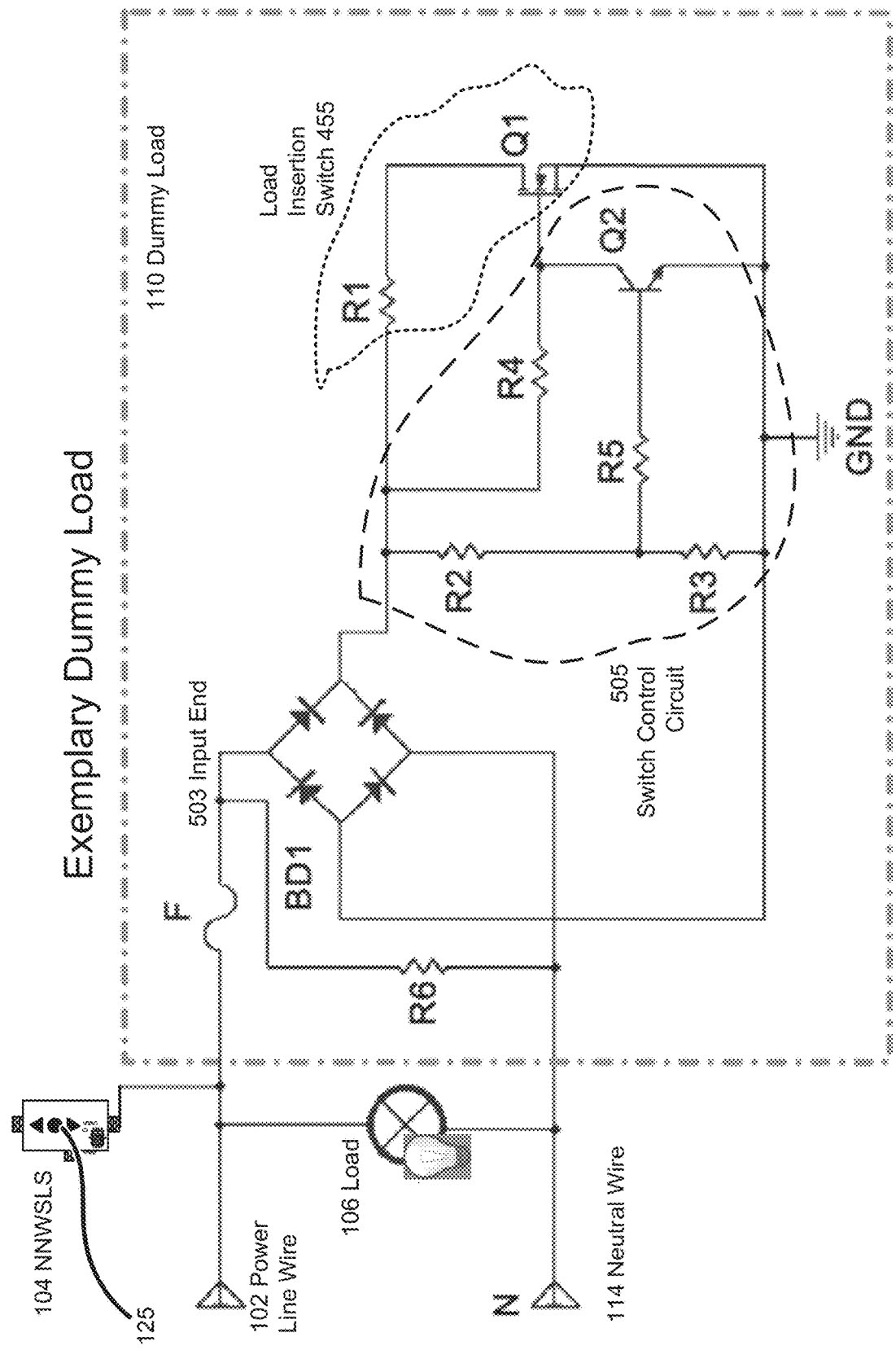
FIG. 5 is a schematic diagram of an exemplary dummy load circuit according the present system and method.

FIG. 5 is a schematic illustration of an exemplary dummy load circuit 110 according to the present system and method. Persons skilled in the relevant arts will appreciate that the dummy load of FIG. 5 is exemplary only, and is not limiting; numerous other dummy load circuits, some simpler and some more complex, may be envisioned within the scope of the appended claims.

In one embodiment of the present system and method, the dummy load circuit 110 may include a rectifier circuit BD1 which is connected between an input end 503 of the dummy load circuit 110 and the load insertion switch 455. The rectifier circuit BD1 rectifies alternating current into direct current. And, according to the type of applied load 106, different rectifier circuits can be designed. For example, the rectifier circuit can be realized in the form of a rectifier bridge. When the load insertion switch 455 is a MOS transistor Q1, the bidirectional conduction of the switch 455 can be realized through the rectifier bridge BD1, so that the resistance of the dummy load circuit 110 can be connected in both half-wave cycles of the sinusoidal voltage signal of supplied alternating current.

In a system circuit 100 composed of a single NNWSLS 104 and an application load 106, the dummy load circuit 110 according to the present invention is shown in a dashed rectangular frame. In an embodiment of the present system and method, the dummy load circuit 110 may include: a fuse F; a rectifier bridge BD1; a load insertion switch circuit 455 composed of a first resistor R1 and a first switch Q1; a second resistor R2, a third resistor R3, a fourth resistor R4, a fifth resistor R5, and a switch control device Q2, which together constitute a switch control circuit 505; and a sixth resistor R6 connected in parallel with the application load between the fuse F and the rectifier bridge.

Effective load: The sixth resistor R6 effectively establishes the resistance level of the dummy load circuit 110. In a much simpler embodiment of the dummy load 110, R6 may be effectively the only component of the dummy load circuit 110.

Here, the first switch Q1 is a MOS transistor, and the switch control device Q2 is a BJT transistor. The drain of the MOS transistor Q1 is connected to one end of the first resistor R1, and its source is grounded. In addition, the gate of the MOS transistor Q1 is connected to the collector of the transistor Q2, and a fourth resistor R4 is connected upstream of the Q2 gate and the Q2 collector.

The emitter of the transistor Q2 is grounded and the base is connected to one end of the fifth resistor R5. The fifth resistor R5 is connected to a pure resistance circuit formed by the second resistor R2 and the third resistor R3, with the specific connection between the second resistor R2 and the third resistor R3.

As shown in FIG. 5, the entire dummy load circuit 110 is connected in parallel with the application load 106. Here, the application load 106 is, for example, an LED lamp. The single live wire switch NNWSLS 104, that is, the power and control module, is connected in series on the power line wire 102 upstream of the application load 106, and the on/off switch function of the NNWSLS 104 is realized by one or more mechanical/rotary switches 125 (or other user-controllable switching elements, such as voice or touch-screen control) that function to open and close the application load 106 (that is, turn the load on or off).

When the system 100 consisting of the NNWSLS 104 and the load adapter 200 with an LED lamp 106 is in the on state, a voltage drop Vd on the dummy load circuit rises from zero. At this time, the MOS switch Q1 is turned on and the first resistor R1 is connected. Thus, the current flows through the rectifier bridge BD1, the first resistor R1, and the MOS transistor Q1 and forms a loop.

In the embodiment shown in FIG. 5, a threshold value Vth is set by adjusting the values of the second resistance R2, the third resistance R3, and the fifth resistance R5. When the voltage drop Vd rises from zero to the threshold Vth, the transistor Q2 is in a saturated state and it is turned on, so that current flows from the collector to the emitter of the transistor Q2. Since the collector of the transistor Q2 is connected to the gate of the MOS transistors Q1, the MOS transistor Q1 is disconnected at this time, and the first resistor R1 is also disconnected. Therefore, current flows through the rectifier bridge BD1, the fourth resistor R4, and the transistor Q2 and forms a loop. Subsequently, the application load enters stable operation.

When the system is off, the voltage drop Vd on the dummy load circuit drops from the high voltage level. When the voltage drop Vd drops to the threshold value Vth, the transistor Q2 is in the off state, so that no current flows between the collector and the emitter of the transistor Q2. Therefore, the MOS transistor Q1 is turned on again, and subsequently the first resistor R1 is connected. When the voltage drop Vd drops to zero, the MOS transistor is turned off and the first resistor R1 is also disconnected from the dummy load circuit.

The rectifier circuit BD1 can also be realized in the form of a diode. In the case of a diode, the first resistance of the dummy load circuit 110 is only connected in one half-wave period of the sinusoidal voltage signal. In various embodiments of the present system and method, the design of the rectifier circuit BD1 can be adapted to match an expected type of applied load 106. Those skilled in the art can design various rectifier circuits BD1, such as full-bridge, half-bridge, and Czochralski circuits, as required.

In another embodiment of the present system and method, the dummy load circuit 110 does not have a rectifier circuit, but has a voltage stabilizing circuit. The voltage stabilizing circuit is composed of, for example, a voltage stabilizing diode.

Further elements of exemplary dummy load circuits 110 are discussed in co-pending U.S. patent application Ser. No. 16/798,282, filed 21 Feb. 2020, entitled "Dummy load design for smart no-neutral Dimmer (switch)"; and in Chinese patent application number 2019107068987 filed Jul. 31, 2019, assigned to General Electric Lighting. These additional elements and embodiments will not be discussed further in this document.

Further Embodiments

In some embodiments, the present system and method may entail a smart lighting switch comprising a smart sensing, control, or communication system (SSCCS) such as an integrated WiFi comp, where the smart switch is configured to be operational while devoid of a neutral wire connection (for example, in older homes which are not wired with neutral wire connections of light switches). Because such a smart switch can induce electrical fluctuations in a power load, such as a light bulb, the present system and method further entails the use of a load adapter for the power load. The load adapter is configured to be an electrical and structural intermediary between the power load, such as a light bulb, and a conventional receptacle (such as a light socket) for the light bulb. The load adapter has an integrated dummy load configured to be in parallel with the power load, when the power load is inserted in the load adapter. The dummy load provides an alternative electrical pathway for low levels of electricity which may run through the light socket even when the smart lighting switch is set to an "off" configuration. The dummy load can mitigate (eliminate or reduce) an electrical instability of the power load due to low-levels of current that may run through the smart lighting switch to power the WiFi or other SSCCS.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. An enhanced smart load system (ESLS) comprising: a no neutral write neutral-wire smart lighting switch (NNWSLS) configured to be operational while devoid of a neutral wire connection and comprising a smart sensing, control, or communication system (SSCCS); and a load adapter comprising: an adapter socket configured to receive a power load, an adapter base configured to provide mechanical and electrical coupling to an electrical socket for the power load; a dummy load configured to be in parallel with the power load; wherein the dummy load is configured to mitigate an electrical instability of the power load due to the NNWSLS; and an electrical switch configured to determine that the dummy load is inserted in parallel configuration with the load or is not inserted in parallel configuration with the load.

2. The ESLS of claim 1, wherein the SSCCS comprises an integrated WiFi device.

3. The ESLS of claim 1, wherein the SSCCS comprises an integrated Bluetooth transceiver.

4. The ESLS of claim 1, where the adapter socket is: configured to receive a light bulb; and
configured to provide the electrical and mechanical coupling to a socket for a light bulb.

5. The ESLS of claim 1, where the dummy load comprises a resistor.

6. The ESLS of claim 1, where the dummy load is configured to mitigate at least one of a ghost lighting and a flicker of light bulb installed in the load adapter.

7. The ESLS of claim 1, dummy load is configured to mitigate at least one of a ghost lighting and a flicker of light bulb installed in the load adapter.

8. The ESLS of claim 1, wherein the load adapter further comprises a rectifier circuit configured to mitigate the electrical instability with an alternating current input.

9. A smart lighting switch comprising: a line connection, a ground connection, and a load connection, wherein the smart switch is devoid of a neutral wire connection; and a smart sensing, control, or communication system (SSCCS), wherein: the smart lighting switch is configured to supply power to the SSCCS via the line connection and the ground connection when the smart lighting switch is not supplying electrical power to a connected lighting element; and the smart lighting switch is configured to be operated with a structurally separate dummy load wired in parallel with a power load fed by the smart lighting switch, if it is determined by an electrical switch, that the dummy load is to be inserted in parallel configuration with the power load or is not inserted in parallel configuration with the load.

10. The smart lighting switch of claim 9, wherein the SSCCS comprises an integrated WiFi device.

11. The smart lighting switch of claim 9, wherein the SSCCS comprises an integrated Bluetooth transceiver.

12. A load adapter comprising: an adapter socket configured to receive a power load, an adapter base configured to provide mechanical and electrical coupling to an electrical socket for the power load; a dummy load configured to be in parallel with the power load; wherein the dummy load is configured to mitigate an electrical instability of the power load due to a residual current supplied to the power load; and an electrical switch configured to determine that the dummy load is inserted in parallel configuration with the load or is not inserted in parallel configuration with the load.

13. The load adapter of claim 12, wherein the adapter socket is:
configured to receive a light bulb; and
configured to provide the electrical and mechanical coupling to a socket for a light bulb.

14. The load adapter of claim 12, where the dummy load comprises a resistor.

15. The load adapter of claim 12, where the dummy load is configured to mitigate at least one of a ghost lighting and a flicker of a light bulb installed in the load adapter due to the residual current.

16. The load adapter of claim 12, further comprises a rectifier circuit configured to mitigate the electrical instability with an alternating residual current input.

* * * * *